(12) United States Patent
Hartzel et al.

(10) Patent No.: US 9,044,923 B2
(45) Date of Patent: Jun. 2, 2015

(54) MULTILAYER FLUOROPOLYMER FILMS

(75) Inventors: William Hartzel, Cherry Hill, NJ (US); Saeid Zerafati, Villanova, PA (US); Gregory S. O'Brien, Downingtown, PA (US)

(73) Assignee: Arkema Inc., King of Prussia, PA (US)

( * ) Notice: Subject to any disclaimer, the term of this patent is extended or adjusted under 35 U.S.C. 154(b) by 558 days.

(21) Appl. No.: 11/817,054

(22) PCT Filed: Dec. 20, 2006

(86) PCT No.: PCT/US2006/048694
§ 371 (c)(1),
(2), (4) Date: Aug. 24, 2007

(87) PCT Pub. No.: WO2007/078972
PCT Pub. Date: Jul. 12, 2007

(65) Prior Publication Data
US 2008/0261050 A1      Oct. 23, 2008

Related U.S. Application Data

(60) Provisional application No. 60/754,782, filed on Dec. 29, 2005.

(51) Int. Cl.
| | | |
|---|---|---|
| B32B 1/02 | (2006.01) | |
| B32B 1/08 | (2006.01) | |
| B32B 27/08 | (2006.01) | |
| B32B 27/30 | (2006.01) | |
| B32B 27/28 | (2006.01) | |
| C08J 5/18 | (2006.01) | |
| B32B 27/32 | (2006.01) | |
| B32B 27/34 | (2006.01) | |
| B32B 27/36 | (2006.01) | |

(52) U.S. Cl.
CPC . *B32B 27/08* (2013.01); *B32B 1/08* (2013.01); *B32B 1/02* (2013.01); *B32B 27/28* (2013.01); *C08J 5/18* (2013.01); *C08J 2327/16* (2013.01); *B32B 27/304* (2013.01); *B32B 27/306* (2013.01); *B32B 27/32* (2013.01); *B32B 27/34* (2013.01); *B32B 27/36* (2013.01); *B32B 2250/24* (2013.01); *B32B 2250/246* (2013.01); *B32B 2439/00* (2013.01); *B32B 2439/46* (2013.01); *B32B 2439/80* (2013.01)

(58) Field of Classification Search
None
See application file for complete search history.

(56) References Cited

U.S. PATENT DOCUMENTS

| | | | | |
|---|---|---|---|---|
| 4,585,694 | A * | 4/1986 | Dehennau | 428/355 EN |
| 4,959,269 | A * | 9/1990 | Dehennau | 428/421 |
| 5,419,374 | A | 5/1995 | Nawrot et al. | |
| 5,496,294 | A * | 3/1996 | Hergenrother et al. | 604/524 |
| 5,695,483 | A * | 12/1997 | Samson | 604/526 |
| 2003/0194564 | A1* | 10/2003 | Araki et al. | 428/421 |
| 2004/0023037 | A1 | 2/2004 | Baumert et al. | |
| 2004/0048016 | A1* | 3/2004 | Wang et al. | 428/35.7 |
| 2005/0037165 | A1* | 2/2005 | Ahern et al. | 428/35.7 |
| 2005/0050854 | A1* | 3/2005 | Zambaux | 53/426 |
| 2005/0170122 | A1 | 8/2005 | Fahrenholz et al. | |
| 2006/0019650 | A1 | 1/2006 | Kedem | |
| 2006/0243666 | A1 | 11/2006 | Jenkins et al. | |
| 2006/0246008 | A1 | 11/2006 | Jenkins et al. | |
| 2006/0246244 | A1 | 11/2006 | Jenkins et al. | |
| 2006/0246537 | A1 | 11/2006 | Jenkins et al. | |
| 2007/0128393 | A1* | 6/2007 | Moulton et al. | 428/36.9 |

FOREIGN PATENT DOCUMENTS

| | | |
|---|---|---|
| CN | 1147447 | 4/1997 |
| CN | 200780025339 | 6/2007 |
| JP | 8142151 | 6/1996 |
| JP | 2001193872 | 7/2001 |
| WO | WO 02/094911 | 11/2002 |
| WO | WO 03068505 A1 * | 8/2003 |
| WO | WO 2005/115753 | 12/2005 |
| WO | WO 2006/040206 | 4/2006 |

\* cited by examiner

*Primary Examiner* — Ramsey Zacharia
(74) *Attorney, Agent, or Firm* — Thomas F. Roland

(57) ABSTRACT

The invention relates to a multi-layer film having at least one fluoropolymer layer, useful for high-purity contact applications. Preferably the fluoropolymer layer(s) are polyvinylidene fluoride polymers and copolymers.

6 Claims, No Drawings

MULTILAYER FLUOROPOLYMER FILMS

This application claims benefit, under U.S.C. §119 or §365 of U.S. Provisional Application No. 60/754,782, filed Dec. 29, 2005; and PCT/US2006/048694, filed Dec. 20, 2006.

FIELD OF THE INVENTION

The invention relates to a multi-layer film having at least one fluoropolymer layer, useful for high-purity contact applications. It also relates to a mono-layer film of a fluoropolymer for use in a high purity contact application. The fluoropolymer layer is a melt-processable fluoropolymer, preferably a polyvinylidene fluoride polymer or copolymer.

BACKGROUND OF THE INVENTION

Many high-purity operations require clean, pure processing environments and containers. Polymers used in these applications must be extremely chemical resistant and capable of being easily sterilized. The high-purity polymers find use in applications including bags or other containers for high purity fluids, biological and biomedical media and high purity chemicals and reagents.

For polymer bags for use as disposable liners in biological/biochemical reactors, current bags have limited chemical resistance and are generally assembled and sterilized offsite by gamma radiation. Current technologies include a multilayer structure and mono layer films with contact layers made of ethylene vinyl acetate (EVA) and linear low density polyethylene (LLDPE); 100 percent polychlorotrifluoroethylene (PCTFE) films or PCTFE films co-extruded with a heat sealable polyolefin layer. These films may include a nylon layer for strength and/or an ethylene vinyl alcohol (EVOH) as a barrier layer.

One problem is that current bags cannot be sterilized in a steam autoclave, as they will melt together and become useless. They are also not easily heat-sealable, or require an extra step to provide heat-sealability, such as the added coextrusion of a polyolefin layer.

Fluoropolymers, and especially polyvinylidene fluoride (PVDF), are known to be highly chemical resistant. Fluoropolymers can be cast into films, including multi-layer PVDF/functionalized polymethyl methacrylate film described in U.S. patent application Ser. No. 10/678,795. In this film, there is not a pure layer of PVDF, but rather a blend of PVDF and another polymer.

There is a need for a polymer material that can provide a high-purity contact surface and can be steam sterilized or gamma ray sterilized, and is heat sealable.

Surprisingly it has now been found that films having at least one melt processable fluoropolymer layer, provide a high-purity material that can be steam sterilized and gamma sterilized.

SUMMARY OF THE INVENTION

The invention relates to a multi-layer fluoropolymer film comprising at least one melt-processable fluoropolymer layer, where the fluoropolymer layer forms the contact layer for fluids or gases.

The invention further relates to a film for use in biological or biopharma applications comprising at least one melt processable fluoropolymer layer, that can be heat sealed directly, without the need for an additional layer.

DETAILED DESCRIPTION OF THE INVENTION

The invention relates to a mono-, or multi-layer film having at least one fluoropolymer layer, useful for high-purity contact applications, as well as to a multi-layer fluoropolymer film.

By "multi-layer film", as used herein is meant a film having two or more layers. The film may consist of 2, 3, 4, 5, 6 or more layers adhered together. Tie layers and adhesive layers may be part of the structure, or the different layers may adhere together without tie-layers of adhesives.

A least one layer of the film is a melt processable fluoropolymer. Preferably, more than one layer is a fluoropolymer.

The term "fluoromonomer" or the expression "fluorinated monomer" means a polymerizable alkene which contains at least one fluorine atom, fluoroalkyl group, or fluoroalkoxy group attached to the double bond of the alkene that undergoes polymerization. The term "fluoropolymer" means a polymer formed by the polymerization of at least one fluoromonomer, and it is inclusive of homopolymers, copolymers, terpolymers and higher polymers which are thermoplastic in their nature, meaning they are capable of being formed into useful pieces by flowing upon the application of heat, such as is done in molding and extrusion processes. Fluoropolymers useful in the present invention are those that are melt processable. Some examples of fluoropolymers that are melt processable include, but are not limited to polyvinylidene fluoride and it's copolymers (PVDF and co-PVDF), ethylene tetrafluoroethylene (ETFE), ethylene chlorotrifluoroethylene (ECTFE), fluorinated ethylene propylene (FEP), tetrafluoroethylene-perfluorovinyl propyl ether (PFA), and any combination of monomers where at least one of them is fluorinated. These could also include EFEP (ethylene, hexafluoropropylene, tetrafluoroethylene), PVDF copolymerized with hexafluoropropylene, perfluorovinyl methyl or propyl ether, ethylene, tetrafluoroethylene, vinyl fluoride, vinyl trifluoride, ethylene, etc., as well as functional monomers such as maleic anhydride, glycidyl methacrylate, etc. Some fluoropolymers that are not part of the invention due to poor melt processability include, but are not limited to propylene chlorotrifluoroethylene (PCTFE) and polytetrafluoroethylene.

Preferred fluoropolymers of the invention are the homopolymer made by polymerizing vinylidene fluoride (VDF), and copolymers, terpolymers and higher polymers of vinylidene fluoride wherein the vinylidene fluoride units comprise greater than 70 percent of the total weight of all the monomer units in the polymer, and more preferably, comprise greater than 75 percent of the total weight of the units. Copolymers, terpolymers and higher polymers of vinylidene fluoride may be made by reacting vinylidene fluoride with one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol, and ethene or propene. Preferred copolymers or terpolymers are formed with vinyl fluoride, trifluoroethene, tetrafluoroethene (TFE), and hexafluoropropene (HFP).

Preferred copolymers are of VDF comprising from about 71 to about 99 weight percent VDF, and correspondingly from about 1 to about 29 percent TFE; from about 71 to 99 weight percent VDF, and correspondingly from about 1 to 29 percent HFP (such as disclosed in U.S. Pat. No. 3,178,399); and from about 71 to 99 weight percent VDF, and correspondingly from about 1 to 29 weight percent trifluoroethylene.

Preferred terpolymers are the terpolymer of VDF, HFP and TFE, and the terpolymer of VDF, trifluoroethene, and TFE, The especially preferred terpolymers have at least 71 weight percent VDF, and the other comonomers may be present in varying portions, but together they comprise up to 29 weight percent of the terpolymer.

The polyvinylidene fluoride could also be a functionalized PVDF, produced by either copolymerization or by post-polymerization functionalization.

The fluoropolymer layer can be a mono-layer film. In a multi-layer film, the fluoropolymer may be anywhere in the structure. In a preferred embodiment, the fluoropolymer layer will be the layer in contact with the media or fluid. In another embodiment, all layers of the multi-layer film are fluoropolymers, and preferably homopolymers and copolymers of PVDF. One especially preferred film is a structure having a PVDF homopolymer as the contact layer and a PVDF copolymer co-extruded or laminated to it. Preferably the at least one PVDF layer is 100 percent PVDF, and not blended with another polymer.

In addition to the fluoropolymer layer(s) in the multi-layer film, other polymer layers, tie layers and adhesive layers may be present. Some particularly useful layers include, but are not limited to, polyolefins such as polyethylene (PE), including linear low density polyethylene (LLDPE), low density polyethylene (LDPE), medium density polyethylene (MDPE), polypropylene (PP), and functional polyolefins (FPO) containing grafted or reacted functional groups such as maleic anhydride or glycidal methacrylate; ethylene vinyl acetate (EVA); polyamides (PA); and high temperature polyolefins such as a 4-methyl pentene-1. Polyvinyl alcohol can also be used as a barrier layer in the multi-layer structure.

Some examples of multi-layer films useful in the invention are listed below. One skilled in the art can imagine many other similar structures that can be tailored to the specific end-use requirements. Some examples include:

1. PVDF Homopolymer/PVDF Copolymer (heterogeneous or homogeneous) noted as CoPVDF. This could be for example KYNAR 720/KYNAR 3120-10 (Arkema Inc.) where the film layers can be adjusted to modify the barrier performance and/or physical properties of the film. This could include copolymers of $VF_2$ with TFE, HFP, CTFE, PPVE, PMVE etc. This could also contain functional monomers or other non-fluoromonomer ingredients. An example with commercial materials from ARKEMA Inc. would be to KYNAR Flex 2850 or KYNAR 2800 or KYNAR 3120 as one layer and KYNAR 740 or KYNAR 720 or Kynar 710 as the second layer.
2. The structure could contain three layers such as PVDF/CoPVDF/PVDF or CoPVDF/PVDF/CoPVDF. The structure could contain more than three layers as one option. The structure could be A/B/A or A/B/C type structures where each letter denotes a different PVDF or CoPVDF.
3. The PVDF or CoPVDF could be functionalized—where the functionality is copolymerized or done after polymerization. This product is noted as PVDF-X.
4. The structure could contain polyolefins such as MDPE or LLDPE or EVA. One option for this structure would be to make: PVDF/PVDF-X/FPO/PE where FPO is a functional polyolefin such as Lotader AX8900. This structure could be produced with PVDF on both sides such as: PVDF/PVDF-X/FPO/PE/FPO/PVDF-X/PVDF. In some applications the structure could be PVDF-X/FPO/PE.
5. The structure could contain other fluoropolymers as a contact layer. This could be EFEP or other fluoropolymers (ETFE, FEP, PFA, ECTFE, PCTFE) where the functional group is copolymerized into the product. EFEP for example could be co-extruded with a Polyamide or with an olefin to make a multi-layer product.
6. In these structures polyamide can be added for additional strength if desired. An example would be PVDF/PVDF-X/Polyamide with or without additional layers.
7. For the optimum in barrier performance, EVOH can be added to the multi-layer structure. An example of this would be: PVDF/PVDF-X/FPO-GMA Lotader/FPO-Orevac/EVOH/FPO-Orevac/PE or PVDF/PVDF-X/PA6/EVOH/PA6. Another example could be PVDF/PVDF-X/EVOH/PVDF-X/PVDF. Another example could be PVDF-30x/EVOH/PVDF-X. The PA6 could also be a PA6 copolymer or a blend or alloy of other PA's with PA6. The PVDF in this structure could be a PVDF copolymer. A similar structure could be made with EFEP (or functionalized ETFE) such as: EFEP/PA6 or EFEP/PA6/EVOH/PA6. The PA6 could be replaced with other Polyamides. Two other structures could be PVDF/PVDF-X/EVOH/PA6 or PVDF/PVDF-X/EVOH/FPO-Orevac/PE. The PA6 could also be a PA6 copolymer or a blend or alloy of other PA's with PA6. The PVDF in these structures could be a PVDF copolymer.
8. A PVDF/PVDF-X/FPO-Lot/PE could be used as an alternative to PVC for blood bags or greenhouse films.
9. A thin layer of acrylic polymer can be solution coated onto various polymer films. These films are commercially available. Examples of these films would be PET or PVDC laminated with thin layer of polymethyl methacrylate (PMMA). PMMA is fully compatible with PVDF. It is possible to create multi-layer film by laminating PVDF onto these films in a hot lamination process. As the result of this technique, it would be possible to design films with PET, PVDC, Nylon, etc. on one side and PVDF on the other side. In this case the PMMA or acrylic polymer would act as the tie layer.

A preferred embodiment is a co-extruded homopolymer PVDF (such as KYNAR 710, KYNAR 720, KYNAR 740, and KYNAR 760) with a PVDF copolymer (such as KYNAR 3120, KYNAR 2800, or KYNAR 2850). Preferably the PVDF homopolymer forms the surface in contact with the fluid or media due to it's high chemical resistance, permeation and melting point. Another preferred embodiment for excellent barrier properties is a film bag of PVDF/EVOH/maleic-anhydride grafted PVDF.

It is contemplated that a metallic layer could be added to the film as a barrier to the outside surface of the film. This could also be a lamination with a foil. This could also have a window of non-metallized material The multi-layer films can be formed by means known in the art. The multi-layer films that can be produced by co-extrusion, lamination or some other process capable of producing these films. These can be produced by extrusion, cast film, blown film and oriented film followed by lamination. The use of tie layer to adhere layers may also be employed.

The multi-layer films of the invention have an overall thickness of from 1 to 50 mils, preferably from 2 to 30 mils, more preferably from 3 to 15 mils and most preferably from 4 to 10 mils. The layer thickness of various layers will depend upon the performance requirements of the application (barrier performance, flexibility, toughness, etc). If the overall film is too thin, it may not provide the barrier properties or integrity needed, and if it is too thick, the ability to weld using conventional film welding techniques can be limited.

The PVDF multi-layer films are autoclavable (steam sterilizable), and gamma sterilizable, as well as having high purity, high barrier performance, and high chemical resistance. The films can also be sterilized with radio frequency radiation. Since the sterilization can easily occur at the production site manufacturers can have an option to assemble and steam sterilize their own system on site. This leads to decreased lead times and increased flexibility for the end user.

Since the multi-layer films of the invention can be gamma sterilized, it also offers the end-user to qualify one system instead of two (one for steam sterilization and one for gamma sterilization).

The PVDF films of the invention have good heat sealability not found with most other fluoropolymers. The heat sealability property of the films allows for the production of high strength joints.

The film of the invention can be formed into containers, fittings, filters, tubing and bags providing the potential to have a system utilizing only one fluid contact material. Since PVDF films have excellent chemical resistance and inertness, a large range of chemicals can be manufactured using the film. The film, both a mono-layer and a multi-layer film, can be used as a barrier layer/contact layer—especially for biological, biomedical, and biopharma contact applications.

Other uses for the invention might include gas sampling bags—including for automotive emissions usage, chemical resistant liners for drums, covers for greenhouses, etc.

EXAMPLES

Example 1

The following multi-layer films were produced by laminating two KYNAR films together in a hot lamination.

| | Film Layer Thickness, mil | | |
|---|---|---|---|
| | KYNAR 720 | KYNAR 3120 | KYNAR 2800 |
| Film 1 | 2 | 5 | |
| Film 2 | 5 | 5 | |
| Film 3 | 2 | | 5 |
| Film 4 | 5 | | 5 |

In Table 1 below, the following abbreviations are used: 2850, 2750, 3120-Flex, 2800—all refer to a single 10 mil layer of the corresponding KYNAR grade (Arkema)

TABLE 1

Physical Properties of KYNAR 10 mil Films

| Sample | Tensile Modulus, Tangent, psi, ASTM D 882 | Tensile @ Yield, psi, ASTM D 882 | Tensile @ Break, psi, ASTM D 882 | Elongation @ Yield, %, ASTM D 882 | Elongation @ Break, %, ASTM D 882 | Tear Strength, g/mil, ASTM D 1004 |
|---|---|---|---|---|---|---|
| 2850 (cross direction) | 138630 (4940) | 5230* (110) | 4470† (180) | 10.6 (0.5) | 463.5 (7.6) | 714 (53) |
| 2850 (machine direction) | 144370 (4180) | 5560* (170) | 5000† (270) | 11.4 (0.3) | 486.7 (62.9) | 653 (38) |
| 2750 (cross direction) | 52960 (1250) | 2520† (60) | 7140* (750) | 14.9 (0.5) | 937.0 (47.6) | 435 (34) |
| 2750 (machine direction) | 42300 (970) | 2540† (100) | 7650* (320) | 18.3 (0.6) | 837.3 (14.4) | 419 (26) |
| 3120 Flex (cross direction) | 96520 (4250) | 3560† (160) | 5300* (850) | 9.6 (0.3) | 753.3 (97.2) | 527 (42) |
| 3120 Flex (machine direction) | 97640 (4580) | 4040† (120) | 8070* (390) | 15.1 (0.3) | 855.6 (27.3) | 577 (35) |
| 2800/720 laminate (cross direction) | 132490 (4470) | 4760† (290) | 4410* (280) | 9.8 (0.9) | 442.5 (18.1) | 669 (55) |
| 2800/720 laminate (machine direction) | 116050 (5810) | 4670† (200) | 7880* (1210) | 12.9 (0.2) | 707.2 (60.4) | 652 (73) |
| 2500 (cross direction) | 33220 (1380) | 1930† (90) | 5250* (850) | 18.2 (0.7) | 1000.6 (70.1) | 401 (37) |
| 2500 (machine direction) | 31570 (1850) | 1930† (90) | 6410* (770) | 19.4 (0.8) | 1004.6 (41.0) | 386 (27) |
| 2800 (cross direction) | 72500 (3620) | 3190† (150) | 6960* (710) | 13.4 (0.5) | 962.1 (34.3) | 511 (58) |
| 2800 (machine direction) | 60600 (1780) | 3130† (70) | 7210* (700) | 15.9 (0.3) | 857.5 (39.1) | 489 (44) |
| 3120/720 laminate (cross direction) | 143480 (5470) | 5190† (160) | 7040* (2050) | 10.8 (0.3) | 710.4 (186.6) | 681 (101) |
| 3120/720 laminate (machine direction) | 135600 (5300) | 5300† (180) | 8600* (1610) | 13.0 (0.4) | 745.5 (67.0) | 695 (19) |

All testing was performed at 23° C. and 50% RH. All samples were conditioned at 50% RH and 23° C. greater than 24 hours prior to testing. Values in parentheses are standard deviations. Samples were die cut from extruded film. Samples were tested using a crosshead speed of 2"/min. Elongation was measured using crosshead travel. n=5 for all data points.

TABLE 2

Puncture Resistance - Testing Performed on Dart Impact Tester {KOP Lab}

|  | 10 Mil Films | | | | | Lam Films 5/5 Mil | |
| --- | --- | --- | --- | --- | --- | --- | --- |
|  | 2500 | 2750 | 2800 | 2850 | 3120 | 2800/720 | 3120/720 |
| Max Load {Lbf} | 45.89 | 48.94 | 51.68 | 50.08 | 59.37 | 59.16 | 61.92 |
| Load at Yield {Lbs} | 40.75 | 42.68 | 50.44 | 49.03 | 48.37 | 47.11 | 51.82 |
| Total Energy {ft-lbs} | 1.01 | 1.14 | 1.14 | 1.09 | 1.45 | 1.48 | 1.56 |

Impact Speed: 10.93 ft/s

TABLE 3

Shrinkage Results: 135° C. For 2 hrs

|  | 10 Mil Films | | | | | Lam Films 5/5 Mil | |
| --- | --- | --- | --- | --- | --- | --- | --- |
|  | 2500 | 2750 | 2800 | 2850 | 3120 | 2800/720 | 3120/720 |
| MACHINE DIRECTION | *0.4 | 0.3% | 0.3% | 0.5% | 0.1% | 0.6% | 0.9% |
| CROSS DIRECTION | *0.5 | 1.2% | 1.0% | 0.6% | 0.7% | 0.7% | 0.5% |

*2500 SAMPLES TESTED @ 100° C. - Samples began to melt @ 135 C.

TABLE 4

Shrinkage Results: 135° C. For 2 hrs

|  | 5 Mil Films | | | | |
| --- | --- | --- | --- | --- | --- |
|  | 2500 | 2750 | 2800 | 2850 | 3120 |
| MACHINE DIRECTION | *-0.5 | -0.9% | -1.2% | -0.4% | -0.1% |
| CROSS DIRECTION | *0.6 | 1.3% | 1.5% | 0.4% | 0.8% |

*2500 SAMPLES TESTED @ 100° C. - Samples began to melt @ 135 C.

Experiment 2

The following multi-layer films were produced using multi-layer blown film coextrusion technique:

TABLE 5

Tensile Properties

| Film structure | Layer (μm) | Tensile Stress at Yield, psi | Tensile Stress at Break, psi | Elongation at yield, % | Elongation at Break, % | Tensile Modulus, Tangent, psi |
| --- | --- | --- | --- | --- | --- | --- |
| PE metallocene | 140 | 4670 | 3180 | 10.5 | 362 | 147500 |
| Orevac | 10 | (170) | (280) | (0.7) | (91) | (9760) |
| EVOH | 25 | | | | | |
| ADX120 + 2850 | 25 | | | | | |
| 2850-00 | 50 | | | | | |
| PE metallocene | 100 | None | 3040 | None | 41 | 162910 |
| Orevac | 10 | detected | (980) | detected | (21) | (7360) |
| EVOH | 25 | | | | | |
| ADX120 + 2850 | 25 | | | | | |
| 2850-00 | 50 | | | | | |
| LDPE | 100 | None | 2360 | None | 119 | 148240 |
| Orevac | 10 | detected | (1490) | detected | (137) | (5120) |
| EVOH | 25 | | | | | |
| ADX120 + 2850 | 25 | | | | | |
| 2850-00 | 50 | | | | | |
| LDPE | 140 | 4090 | 3130 | 10.7 | 434 | 129520 |
| Orevac | 10 | (100) | (260) | (0.4) | (46) | (4290) |
| EVOH | 25 | | | | | |
| ADX120 + 2850 | 25 | | | | | |
| 2850-00 | 50 | | | | | |
| LDPE | 140 | 2710 | 2420 | 13.7 | 592 | 82090 |
| Orevac | 10 | (50) | (120) | (0.6) | (12) | (5140) |
| EVOH | 25 | | | | | |
| Cpd ADX + 2500 | 25 | | | | | |
| 2500-20 | 50 | | | | | |
| LDPE | 100 | 2870 | 2540 | 12.9 | 517 | 90440 |
| Orevac | 10 | (40) | (230) | (0.6) | (32) | (4480) |
| EVOH | 25 | | | | | |
| Cpd ADX + 2500-20 | 25 | | | | | |
| 2500-20 | 50 | | | | | |
| LDPE | 140 | 2710 | 2460 | 13.9 | 516 | 78990 |
| Orevac | 10 | (70) | (190) | (0.7) | (69) | (3390) |
| EVOH | 25 | | | | | |
| Cpd ADX + 2500-20 | 25 | | | | | |
| 2500-20 | 50 | | | | | |

TABLE 5-continued

Tensile Properties

| Film structure | Layer (μm) | Tensile Stress at Yield, psi | Tensile Stress at Break, psi | Elongation at yield, % | Elongation at Break, % | Tensile Modulus, Tangent, psi |
|---|---|---|---|---|---|---|
| PA6 | 150 | 5890 | 7740 | 25.3 | 578 | 169060 |
| Orevac | 25 | (190) | (450) | (1.4) | (68) | (6580) |
| Cpd ADX + 2500-20 | 25 | | | | | |
| 2500-20 | 50 | | | | | |
| PA6 | 110 | 5430 | 6500 | 23.4 | 483 | 162730 |
| Orevac | 25 | (260) | (1460) | (0.7) | (48) | (8360) |
| Cpd ADX + 2500-20 | 25 | | | | | |
| 2500-20 | 50 | | | | | |

All testing was performed at 23° C. and 50% RH. All samples were conditioned at 50% RH and 23° C. greater than 24 hours prior to testing. Values in parentheses are standard deviations. Samples were die cut from extruded film. Samples were tested using a crosshead speed of 2"/min. Elongation was measured using crosshead travel. n=5 for all data points.

TABLE 6

Tear resistance

| Film structure | Layer (μm) | Tear Strength, N/mm | Tear Strength, g/mil |
|---|---|---|---|
| CG 5C 06/325 | | | |
| PE metallocene | 140 | 211 (18) | 547 (47) |
| Orevac | 10 | | |
| EVOH | 25 | | |
| ADX120 + 2850-00 | 25 | | |
| 2850-00 | 50 | | |
| PE metallocene | 100 | 213 (18) | 552 (47) |
| Orevac | 10 | | |
| EVOH | 25 | | |
| ADX120 + 2850-00 | 25 | | |
| 2850-00 | 50 | | |
| LDPE | 100 | 187 (16) | 485 (41) |
| Orevac | 10 | | |
| EVOH | 25 | | |
| ADX120 + 2850-00 | 25 | | |
| 2850-00 | 50 | | |
| LDPE | 140 | 183 (29) | 540 (75) |
| Orevac | 10 | | |
| EVOH | 25 | | |
| ADX120 + 2850-00 | 25 | | |

TABLE 6-continued

Tear resistance

| Film structure | Layer (μm) | Tear Strength, N/mm | Tear Strength, g/mil |
|---|---|---|---|
| 2850-00 | 50 | | |
| LDPE | 140 | 136 (7) | 353 (18) |
| Orevac | 10 | | |
| EVOH | 25 | | |
| Cpd ADX + 2500-20 | 25 | | |
| 2500-20 | 50 | | |
| LDPE | 100 | 147 (2) | 381 (5) |
| Orevac | 10 | | |
| EVOH | 25 | | |
| Cpd ADX + 2500-20 | 25 | | |
| 2500-20 | 50 | | |
| LDPE | 140 | 140 (3) | 363 (8) |
| Orevac | 10 | | |
| EVOH | 25 | | |
| Cpd ADX + 2500-20 | 25 | | |
| 2500-20 | 50 | | |
| PA6 | 150 | 284 (30) | 736 (78) |
| Orevac | 25 | | |
| Cpd ADX + 2500-20 | 25 | | |
| 2500-20 | 50 | | |
| PA6 | 110 | 252 (9) | 653 (23) |
| Orevac | 25 | | |
| Cpd + 2500-20 | 25 | | |
| 2500-20 | 50 | | |

Experiments 3

Following multi-layer film was produced by laminating Kynar onto an acrylic coated polyester film in a hot lamination process:

TABLE 7

Tensile Properties

| Film structure | Layer (μm) | Tensile Stress at Yield, psi | Tensile Stress at Break, psi | Elongation at yield, % | Elongation at Break, % | Tensile Modulus, Tangent, psi |
|---|---|---|---|---|---|---|
| Kynar 2500-20 polyester | | | | | | |
| 2500-20 + polyester | 2000 | None detected | 21300 (920) | None detected | 160 (11) | 476050 (18280) |

TABLE 8

| Film structure | Layer (μm) | Tear Strength, N/mm | Tear Strength, g/mil |
|---|---|---|---|
| Kynar 2500-20 polyester | | | |
| 2500-20 + polyester | 2000 | 853 (90) | 2211 (233) |

What is claimed is:

1. A sterilized, co-extruded, multi-layer film for use in sterile chemical, biological, biomedical or biopharma applications having a polyvinylidene fluoride (PVDF) homopolymer or copolymer layer in contact with a biological or biopharma fluid or gas, and wherein said film has undergone sterilization by exposure to steam, radio frequency radiation, or gamma radiation, wherein said film is a barrier for said biological or biopharma fluid or gas, and wherein said co-extruded multi-layer film is a multilayer film consisting of one layer of a polyvinylidene fluoride homopolymer and one layer of a polyvinylidene fluoride copolymer wherein said PVDF copolymer comprises greater than 70 weight percent of vinylidene fluoride monomer units.

2. The film of claim 1, wherein said polyvinylidene fluoride polymer and copolymer layer consists entirely of polyvinylidene fluoride homopolymer or copolymer, and is not a blend with any other polymer.

3. The film of claim 1, wherein the overall thickness of said film is from 1-50 mil.

4. The film of claim 1 comprising a container, fitting, tubing, or bag.

5. The film of claim 1, wherein said film comprises at least one heat seal.

6. The film of claim 1, wherein said copolymer comprises vinylidene fluoride and hexafluoropropene units.

* * * * *